(12) United States Patent
Inazumi et al.

(10) Patent No.: US 7,076,340 B1
(45) Date of Patent: Jul. 11, 2006

(54) METHOD OF CONTROLLING SPEED OF SYNCHRONOUS MOTOR, AND METHOD OF IDENTIFYING CONSTANT OF SYNCHRONOUS MOTOR

(75) Inventors: Masanobu Inazumi, Fukuoka (JP);
Masanori Kawatani, Fukuoka (JP);
Noriaki Sueyoshi, Fukuoka (JP);
Ryuichi Oguro, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 09/979,798

(22) PCT Filed: May 25, 2000

(86) PCT No.: PCT/JP00/03363

§ 371 (c)(1),
(2), (4) Date: Nov. 27, 2001

(87) PCT Pub. No.: WO00/74228

PCT Pub. Date: Dec. 7, 2000

(30) Foreign Application Priority Data

Feb. 17, 1999 (JP) ............................................. 11-359319
May 28, 1999 (JP) ............................................. 11-149992

(51) Int. Cl.
*H02P 1/24* (2006.01)
*H02P 5/28* (2006.01)
*H02P 7/36* (2006.01)

(52) U.S. Cl. ......................... 700/298; 318/700; 318/720
(58) Field of Classification Search ................. 700/286, 700/289, 296–298; 187/224; 318/138, 254, 318/434, 439, 700, 716, 720, 721, 722, 723, 318/724, 727
See application file for complete search history.

(56) References Cited

U.S. PATENT DOCUMENTS

| 5,569,994 | A | * | 10/1996 | Taylor et al. | 318/700 |
| 5,585,709 | A | * | 12/1996 | Jansen et al. | 318/807 |
| 5,834,918 | A | * | 11/1998 | Taylor et al. | 318/601 |
| 5,886,498 | A | * | 3/1999 | Sul et al. | 318/821 |
| 5,903,128 | A | * | 5/1999 | Sakakibara et al. | 318/721 |
| 5,920,161 | A | * | 7/1999 | Obara et al. | 318/139 |
| 6,051,946 | A | * | 4/2000 | Yamada et al. | 318/432 |
| 6,081,093 | A | * | 6/2000 | Oguro et al. | 318/807 |
| 6,107,774 | A | * | 8/2000 | Yamada et al. | 318/807 |
| 6,163,127 | A | * | 12/2000 | Patel et al. | 318/700 |
| 6,163,128 | A | * | 12/2000 | Hiti et al. | 318/722 |
| 6,281,656 | B1 | * | 8/2001 | Masaki et al. | 318/700 |
| 6,320,349 | B1 | * | 11/2001 | Kaneko et al. | 318/798 |
| 6,344,725 | B1 | * | 2/2002 | Kaitani et al. | 318/700 |
| 6,456,030 | B1 | * | 9/2002 | Masaki et al. | 318/700 |
| 6,462,491 | B1 | * | 10/2002 | Iijima et al. | 318/254 |
| 6,832,127 | B1 | * | 12/2004 | Hao et al. | 700/170 |
| 6,850,426 | B1 | * | 2/2005 | Kojori et al. | 363/123 |
| 6,975,086 | B1 | * | 12/2005 | Honda et al. | 318/560 |

FOREIGN PATENT DOCUMENTS

| JP | 60-183953 | | 9/1985 |
| JP | 11299299 | A * | 10/1999 |
| JP | 2000050677 | A * | 2/2000 |

* cited by examiner

*Primary Examiner*—Anthony Knight
*Assistant Examiner*—Sunray Chang
(74) *Attorney, Agent, or Firm*—Sughrue Mion, PLLC (57) ABSTRACT

In sensorless vector control performed through use of a rotation speed of a synchronous motor 6 and the position of a rotor, a positive current is caused to flow to a γ axis on the assumption that a "d" axis serving as a true magnetic axis is out of phase with the γ axis by only an angle of load θe, whereby torque which is proportional to iγ sin θe and directed toward the γ axis arises in the magnetic axis. Accordingly, a deviation between a d-q axis serving as a true magnetic axis and a γ-δ axis serving as a control axis is eliminated. Even if load is exerted on the motor, the γ axis serving as a control axis is constantly aligned with the "d" axis serving as the magnetic axis of the synchronous motor, thereby enabling excellent vector control.

5 Claims, 7 Drawing Sheets

METHOD OF CONTROLLING SPEED OF SYNCHRONOUS MOTOR, AND METHOD OF IDENTIFYING CONSTANT OF SYNCHRONOUS MOTOR

FIELD OF THE INVENTION

The present invention relates to a method of controlling the speed of a synchronous motor, and more specifically, to a method of controlling the speed of a permanent-magnet-type synchronous motor without use of sensors, as well as to a method of identifying a constant of a controller for driving a synchronous motor.

BACKGROUND ART

Conventionally, sensorless vector control of a synchronous motor employs, as inputs, a difference between a stator current converted into a γ-δ coordinate system set on poles of a rotor and a current estimated most recently and a voltage instruction converted into the γ-δ coordinate system, thereby estimating an electric current and induced voltage of the γ-δ coordinate system and the speed of the rotor.

Through use of a γ-axis induced voltage and an angular speed of the rotor, which are estimated by this method, an angle of error between a d-q coordinate and the γ-δ coordinate set on permanent magnets of the rotor is estimated, whereby the position of the rotor is modified.

Vector control of the motor is performed through use of the angular speed and information about the position of the magnetic axis, which are estimated by the above method.

However, the background art technology encounters a problem. Namely, as a synchronous motor rotates at low speed, a voltage induced by the synchronous motor decreases, thereby deteriorating the accuracy of estimation of the magnetic axis. If vector control of the synchronous motor is performed within a low-speed range, the magnetic axis is lost. Accordingly, the synchronous motor can no longer be controlled.

When large torque is exerted on the synchronous motor within a low-speed range, the angle of load becomes excessively wide, and a difference in angle between a control axis and the magnetic axis of the synchronous motor becomes greater. As a result, a smooth shift toward vector control for controlling the synchronous motor while the control axis is aligned with the magnetic axis fails, thereby causing a problem of the synchronous motor no longer being under control.

Accordingly, the present invention is aimed at providing a superior method of estimating the speed of a synchronous motor, which method enables accurate specification of a magnetic axis even within a low-speed range. Particularly, a first object of the present invention is to provide a method of controlling the speed of a synchronous motor, which method enables realization of a favorable shift toward vector control by means of aligning a control axis with a magnetic axis in the event of great torque being exerted on the synchronous motor within a low-speed range.

Noting that a converter for vector control purpose can accurately control the magnitude, frequency, and phase of an output current, there has been proposed a method comprising the steps of supplying a predetermined current to a motor, measuring a current constant of the induced motor with high accuracy on the basis of a motor voltage induced by the current, and setting, on the basis of a result of measurement, a control-operation constant of an induced motor control system (Japanese Patent Application Laid-Open No. 183953/1985).

However, a method of identifying the constant of a synchronous motor has not yet been proposed for a controller for driving the motor. The control constant of the motor has hitherto been set on the basis of a design constant of the motor. The control constant of each motor to be used must be changed, thus involving an element of inconvenience. The disparity between the design value and a real value induces occurrence of an error in control operation, thereby deteriorating the operating performance of the motor. If the control constant of a motor is manually measured through use of a measuring instrument, there arises a problem of consuming time and deteriorating the accuracy of the constant of the motor.

A second object of the present invention is to provide a method of identifying an induced voltage constant and a d-axis inductance of a motor with high accuracy and at high speed.

DISCLOSURE OF THE INVENTION

To achieve the first object, the present invention provides a sensorless control method for use with a synchronous motor which uses a permanent magnet as a rotor, in which the motor is controlled such that a d-q axis set on a magnetic pole of the rotor is aligned with a γ-δ axis assumed to be set on the rotor, the method comprising the steps of:

detecting stator currents of at least two phases supplied to the synchronous motor at time k·Ts (where k=0, 1, 2, 3, . . . , and Ts denotes a sampling time);

deriving a γ-axis current iγ(k) and a δ-axis current iδ(k) by means of converting the stator currents to a γ-δ coordinate system;

constructing a status estimator by means of taking a difference between the γ-axis current iγ(k) and a γ-axis current iγ$_{est}$(k) estimated in a previous control loop as a correction iγ(k)−iγ$_{est}$(k), taking a difference between the δ-axis current iδ(k) and a δ-axis current iδ$_{est}$(k) estimated in a previous control loop as a correction iδ(k)−iδ$_{est}$(k), taking voltage instructions Vγ*(k) and Vδ*(k) converted into the γ-δ coordinate system as inputs, and taking γ-axis induced voltage εγ(k) and a δ-axis induced voltage εδ(k) resulting from rotation of the rotor of the synchronous motor as disturbances which stem from a current response when the rotor remains unrotated;

estimating currents iγ$_{est}$(k+1) and iδ$_{est}$(k+1) and induced voltages εγ$_{est}$(k+1) and εδ$_{est}$(k+1) at time (k+1)·Ts seconds;

determining the sign of speed of the rotor from the sign of the estimated induced voltage εγ$_{est}$(k+1);

estimating the value of angular speed ω$_{rm}$(k+1) of the rotor from the sum of the square of the induced voltage εγ$_{est}$(k+1) and the square of the induced voltage εδ$_{est}$(k+1) as well as from the determined sign;

deriving a δ-axis direction current instruction by means of feedback control for multiplying a variation between a synchronous motor speed instruction ω$_{rref}$ and an estimated speed ω$_{rmest}$(k+1) by a gain, thereby inducing generation of rotation torque for the synchronous motor; and taking a γ-axis current instruction as positive, thereby causing generation of torque for constraining a magnetic axis "d" to the γ axis.

The present invention also provides a sensorless speed control method for a synchronous motor, comprising the steps of:

taking a magnetic axis of the synchronous motor as a "d" axis and taking an axis leading the "d" axis by 90° as a "q" axis;

taking a coordinate d-q axis rotating at a synchronous motor rotation speed $\omega_{rm}$ and a specified magnetic axis of the synchronous electric motor as γ, and taking an axis leading γ by 90° as δ, thereby setting a γ-δ axis rotating at a synchronous motor rotation instruction speed $\omega_{rm*}$;

taking a γ-axis direction current instruction iγ* and a δ-axis direction current instruction iδ* as positive, thereby inducing torque for constraining a magnetic axis "d" at an angle leading the γ axis;

deriving a δ-axis direction current instruction by means of feedback control for multiplying, by a gain, a variation between the synchronous motor rotation instruction speed $\omega_{rm*}$ and an estimated speed $\omega_{rmest}$ derived through disturbance observation, which observation is prepared by a δ-axis current formula and is taken as a synchronous motor induced voltage disturbance;

adding, to the δ-axis direction current instruction, a variation angle correction instruction iδθ* derived from an external observation by way of a proportional integration controller, the observation being prepared by a γ-axis current formula and being taken as a synchronous motor induced voltage disturbance; and aligning a γ axis rotating at instruction speed $\omega_{rm*}$ with a real magnetic axis "d."

According to such a method of controlling the speed of a synchronous motor, provided that a "d" axis serving as a real magnetic axis is out of phase with a γ axis by only an angle of load θe when a d.c. current iγ flows, in a positive direction, to a γ axis serving as an arbitrarily-specified axis, torque proportional to iγ sin θe develops in the "d" axis serving as a magnetic axis so as to head toward the γ axis in a case where no load is exerted on the motor and the angle of load θe is small. As a result, the "d" axis serving as a real magnetic axis undergoes torque which is constantly headed toward a specified γ axis, whereby the γ axis is aligned with a δ axis. By means of causing a γ axis current instruction iγ* to flow in a low-speed range, specification of a magnetic axis in a low-speed range becomes feasible, thereby enabling good vector control.

When the "d" axis serving as a magnetic axis is constrained, a synchronous motor not having a damper winding usually assumes a dumping factor of substantially zero. The "d" axis induces simple harmonic oscillations around the γ axis. Hence, a current instruction derived by means of feeding back an estimated speed is taken as a δ-axis current. Thus, transient vibrations in the "d" axis are dampened. Provided a synchronous motor induced voltage is taken as ε, ε sin θe is estimated from an estimated disturbance $εγ_{est}$ derived by a γ-axis current formula. In a case where the angle of load is small, $εγ_{est}$ assumes a value proportional to the angle of load. Hence, the magnetic axis "d" can be constrained by iγ*. However, since the angle of load becomes great, the magnetic axis "d" cannot be constrained in particularly a low-speed range. Hence, a correction current instruction iδθ* produced by proportional integration of the estimated disturbance $εγ_{est}$ is added to the δ-axis current instruction. A constraint current is caused to flow to the δ axis as a correction current. As a result, a correction current is caused to flow until $εγ_{est}$ assumes a value of 0: that is, the γ axis is aligned with the "d" axis. Consequently, an excessive increase in the angle of load is prevented, thereby enabling the γ axis to be aligned with the "d" axis.

To achieve the second object, the present invention provides a method of identifying a constant of a controller of a synchronous motor which computes the speed of the motor from two-phase current supplied to the motor, the controller including a δ-axis speed controller for outputting a δ-axis current instruction on the basis of a signal relating to a variation between a speed instruction and the speed of the motor, a δ-axis current controller for computing a δ-axis voltage instruction from a δ-axis current instruction, a γ-axis current controller for computing a γ-axis voltage instruction from a γ-axis current instruction, a vector control circuit outputting the absolute value of a voltage instruction and the phase of the voltage instruction on the basis of the δ-axis voltage instruction and the γ-axis voltage instruction, and an inverter circuit for supplying a drive current to the synchronous motor on the basis of the absolute value of a voltage instruction and the phase of the voltage instruction, the method comprising the steps of:

setting an α-β space coordinate system which takes a U phase of a rotor of the motor as an α axis and has a β axis leading from the α axis by an electric angle of 90° in the direction of forward rotation;

assuming a γ-δ axis rotating at a synchronous motor rotation instruction speed $\omega_{rm*}$ in the α-β space coordinate system while taking a real magnetic axis of the synchronous motor as a "d" axis, taking an axis leading 90° from the "d" axis as a "q" axis, a coordinate d-q axis rotating at a synchronous motor rotation speed $\omega_{rm}$ and a specified magnetic axis of the synchronous motor as a γ axis, and taking an axis leading the γ axis by 90° as a δ axis; and adjusting an induced voltage constant such that an estimated speed $\omega_{rmest}$ to which a correction is added so as to become equal to an estimated speed $\omega_{rmest'}$ to which no correction is added, through use of a synchronous motor induced voltage $e_{dest}$ prepared by a δ-axis current formula, the formula taking a γ-δ-axis current and a δ-axis voltage instruction $v_{d*}$ as inputs and taking a voltage induced in the synchronous motor as a disturbance, thereby identifying the induced voltage constant.

Preferably, the method is embodied as software, and the software is installed in an inverter, thereby embodying means for accurately identifying a constant at high speed.

The present invention also provides a method of identifying a constant of a controller of a synchronous motor which computes the speed of the motor from two-phase current supplied to the motor, the controller including a δ-axis speed controller for outputting a δ-axis current instruction on the basis of a signal relating to a variation between a speed instruction and the speed of the motor, a δ-axis current controller for computing a δ-axis voltage instruction from a δ-axis current instruction, a γ-axis current controller for computing a γ-axis voltage instruction from a γ-axis current instruction, a vector control circuit outputting the absolute value of a voltage instruction and the phase of the voltage instruction on the basis of the δ-axis voltage instruction and the γ-axis voltage instruction, and an inverter circuit for supplying a drive current to the synchronous motor on the basis of the absolute value of a voltage instruction and the phase of the voltage instruction, the method comprising the steps of:

setting an α-β space coordinate system which takes a U phase of a rotor of the motor as an α axis and has a β axis leading the α axis by an electric angle of 90° in the direction of forward rotation;

setting a γ-δ axis rotating at a synchronous motor rotation instruction speed $\omega_{rm*}$ in the α-β space coordinate system while taking a real magnetic axis of the synchronous motor as a "d" axis, taking an axis leading 90° the "d" axis as a "q" axis, a coordinate d-q axis rotating at a synchronous motor rotation speed $\omega_{rm}$ and a specified magnetic axis of the synchronous motor as a γ axis, and taking an axis leading the γ axis by 90° as a δ axis;

causing several different currents $i_{g*}$ to flow toward the γ axis through use of an estimated δ-axis induced voltage $e_{dest}$ and a γ-axis current instruction $i_{g*}$ which are prepared by a δ-axis current formula, the formula taking a δ-axis direction current $i_d$ and a δ-axis voltage instruction $v_{d*}$ as inputs and taking a δ-axis induced voltage $e_d$ as a disturbance; and adjusting a d-axis inductance such that the estimated δ-axis induced voltages $e_{dest}$ arising at that time become equal to each other, thereby identifying the d-axis inductance.

Preferably, the method for identifying d-axis inductance of the synchronous motor is embodied as software, and the software is installed in an inverter, thereby embodying means for accurately identifying a constant at high speed.

Reference numerals designate the following elements:
1 speed controller
2 δ-axis current controller
3 γ-axis current controller
4 vector control circuit
5 inverter circuit
6 synchronous motor
7 phase converter
8 γ-δ-axis current/induced voltage estimator
9 angular-speed deriving section
10 angle-of-error (θe) deriving section
11 γ-δ-axis position corrector
12 γ-phase/δ-phase current corrector
13 motor-constant identifier A first embodiment of the present invention will now be described by reference to the drawings.

Figure 1:
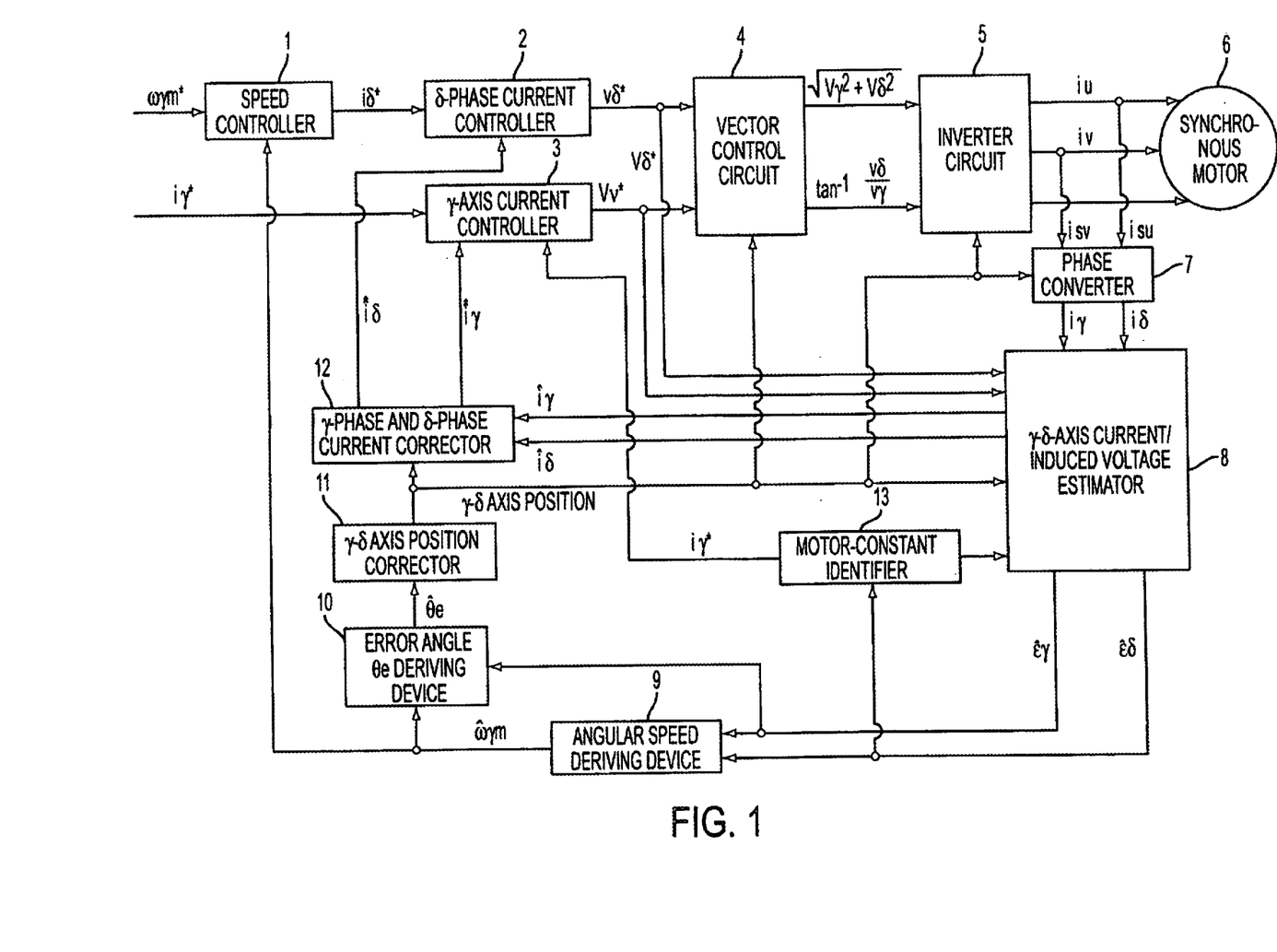
FIG. 1 is a block diagram showing a control system to which a method of controlling the speed of a synchronous motor according to a first embodiment of the present invention.

FIG. 1 is a block diagram showing a control system to which is applied a method of controlling the speed of a synchronous motor according to a first aspect of the present invention.

The first embodiment shown in FIG. 1 is in principle directed toward constructing a sensorless vector control system through use of the rotation speed of a synchronous motor and the position of a rotor estimated according to a method of estimating the speed of a permanent-magnet-type synchronous motor, a method of estimating an angle of error of a rotor of the motor, and a method of correcting the position of the rotor, which are described in Japanese Patent Application Laid-Open No. 191698/1997. However, according to this estimation method, the speed of the synchronous motor and the position of the rotor are estimated from information about an induced voltage. Little information about an induced voltage is available within an estimated low-speed range. Hence, it becomes difficult to correct a discrepancy between a γ-δ axis serving as a control axis and a d-q axis of the synchronous motor, thereby precluding realization of favorable vector control.

At the time of control of the motor within a low-speed region, when a positive current flows to a γ axis, a "d" axis serving as a true magnetic axis is out of phase with the γ axis by only an angle of load. Accordingly, torque—which is proportional to the magnetic axis and directed toward the γ axis—develops. For this reason, the control method described in Japanese Patent Application Laid-Open No. 191698/1997 is improved through use of a method which enables excellent vector control by means of eliminating a deviation between the d-q axis serving as a real magnetic axis and the γ-δ axis serving as a control axis, such that excellent vector control can be ensured over high-speed and low-speed ranges by means of effecting vector control within a high-speed range in accordance with the previously-described example.

As shown in FIG. 1, an angular-speed instruction $\omega_{rm}*$ and an estimated angular-speed $\omega_{rm\ est}$ (an estimated angular-speed will be hereinafter represented as "est") are input to the speed controller 1, and the speed controller 1 outputs a δ-phase current instruction iδ*. The δ-phase current controller 2 receives an estimated δ-phase current $i\delta_{est2}$ output from the current corrector and the current instruction iδ* and outputs a δ-phase voltage instruction Vδ*. A positive γ-phase current instruction iγ* and an estimated γ-phase current $i\gamma_{est2}$ are input to the γ-phase current controller 3. The γ-phase current controller 3 outputs a γ-phase voltage instruction Vγ*. The δ-phase current instruction Vδ*, the γ-phase voltage instruction Vγ*, and the position of the γ-δ axis output from the γ-δ-axis position corrector 11 are input to the vector control circuit 4. The absolute value $(V\delta^2 + V\gamma^2)^{1/2}$ of a voltage and a phase $\tan^{-1}(V\delta/V\gamma)$ from the γ-axis in a direction in which a voltage is output are input to the inverter circuit 5, and a turn-on operation is implemented.

A γ-phase current iγ is produced as a result of a stator current $i_u$ of the synchronous motor 6 passing through the phase converter 7. A δ-phase current iδ is produced as a result of a stator current $i_v$ passing through the phase converter 7. The γ-phase current iγ, the δ-phase current iδ, the position of the γ-δ axis, and the voltage instructions Vδ* and Vγ* are input to the γ-δ-axis current/induced voltage estimator 8. The γ-δ-axis current/induced voltage estimator 8 outputs estimated γ-δ-phase currents $i\gamma_{est}$ and $i\delta_{est}$ and induced γ-δ-phase voltages $\epsilon\gamma_{est}$ and $\epsilon\delta_{est}$. The induced γ-δ-phase voltages $\epsilon\gamma_{est}$ and $\epsilon\delta_{est}$ are input to the angular-speed deriving section 9, where an estimated angular speed $\omega_{rm\ est}$ is derived. The estimated angular speed $\omega_{rm\ est}$ and the induced γ-δ-phase voltages $\epsilon\gamma_{est}$ are input to the angle-of-error $\theta_{e\ est}$ deriving section 10, where an angle of error $\theta_{e\ est}$ between the γ-δ axis and the d-q axis is derived.

The angle of error $\theta_{e\ est}$ is input to the γ-δ axis position corrector 11, thereby correcting the position of the γ-δ axis. As a result, the current corrector 12 corrects an electric current. The motor-constant identifier 13 is an element newly added to the control system in the present embodiment. The motor-constant identifier 13 identifies constants Rs, Lq, and Ld of the synchronous motor, thereby detecting the "d" axis by means of variations in inductance. Further, the motor-constant identifier 13 receives an estimated induced voltage $\epsilon\delta_{est}$ as an estimated disturbance and estimates an angle of error between the d-q axis and the γ-δ axis from known $\epsilon \cos \theta_{e\ est}$. The motor-constant identifier 13 outputs the positive γ-phase current instruction iγ* for causing to flow, to the γ axis, a positive current appropriate to a current to be used for constraining a magnetic axis at low speed.

The operation of the control system will now be described.

In the case of control operation at high speed, at least currents of two phases supplied to the synchronous motor at a point in time k·Ts seconds; for example, $i_u(k)$ and $i_v(k)$, are detected. The electric currents are converted into the γ-δ-axis coordinate system corrected in a previous loop, by means of the phase converter 7, thereby deriving iγ(k) and iδ(k).

Next, voltage instructions Vγ* and Vδ*, which are converted into the γ-δ coordinate system through use of a status estimator constructed in the inducted voltage estimator 8, and the γ-δ-axis current are input. By means of a known method, there are derived estimated values at time (k+1)·Ts seconds: that is, $i\gamma_{est}(k+1)$, $i\delta_{est}(k+1)$, $\epsilon\gamma_{est}(k+1)$, and $\epsilon\delta_{est}(k+1)$.

From the sign of the estimated $\epsilon\delta_{est}(k+1)$, the angular-speed deriving section 9 determines the sign of angular speed. $\omega_{rm\ est}(k+1)$ is derived by means of the thus-determined sign and from the sum of the square of $\epsilon\gamma_{est}(k+1)$ and the square of $\epsilon\delta_{est}(k+1)$. The angle-of-error θe deriving section 10 determines $\theta_{e\ est}(k+1)$ from $\epsilon\gamma_{est}(k+1)$ and $\omega_{rm\ est}(k+1)$, and the γ-δ-axis position corrector 11 corrects the position of the γ axis. Provided that the γ axis has been subjected to axis conversion by only $\rho\theta_{e\ est}(k+1)$, the γ-phase/δ-phase current corrector 12 modifies initial values $i\gamma_{est}(k+1)$, $i\delta_{est}(k+1)$, $\epsilon\gamma_{est}(k+1)$, and $\epsilon\delta_{est}(k+1)$ at the time of a (k+1) loop.

In the case of control operation within a low-speed range, the motor-constant identifier 13 outputs, to the γ-axis current controller 3, the positive γ-phase current instruction iγ* for flowing, to the γ axis, thereby inducing occurrence of torque in a magnetic pole "d" axis, wherein the torque is proportional to $i_\gamma \sin \theta e$ and directed toward the γ axis. Accordingly, a deviation between the magnetic axis d-q and the control axis γ-δ is eliminated, thereby enabling excellent vector control.

A second embodiment of the present invention will be described by reference to the drawings.

Reference numerals designate the following elements:
1 speed controller
2 δ-axis current controller
3 γ-axis current controller
4 vector control circuit
5 inverter circuit
6 synchronous motor
7 phase converter
8 γ-δ-axis current/induced voltage estimator
9 angular-speed deriving section
11 γ-δ-axis position corrector
12 γ-phase/δ-phase current corrector
13 motor-constant identifier
14 shaft current instruction corrector A second embodiment shown in FIG. 2 is directed toward improving control at the time of an increase in load (particularly within a low-speed range). More specifically, if the angle of load θe has become excessively wide as a result of load increasing more than in the previous embodiment, a positive current is caused to flow to the δ axis, thereby dampening transient vibrations in the "d" axis and reducing an angle of load. Further, a magnetic axis is constrained, and a deviation between the magnetic axis d-q and the control axis γ-δ is eliminated.

Figure 2:
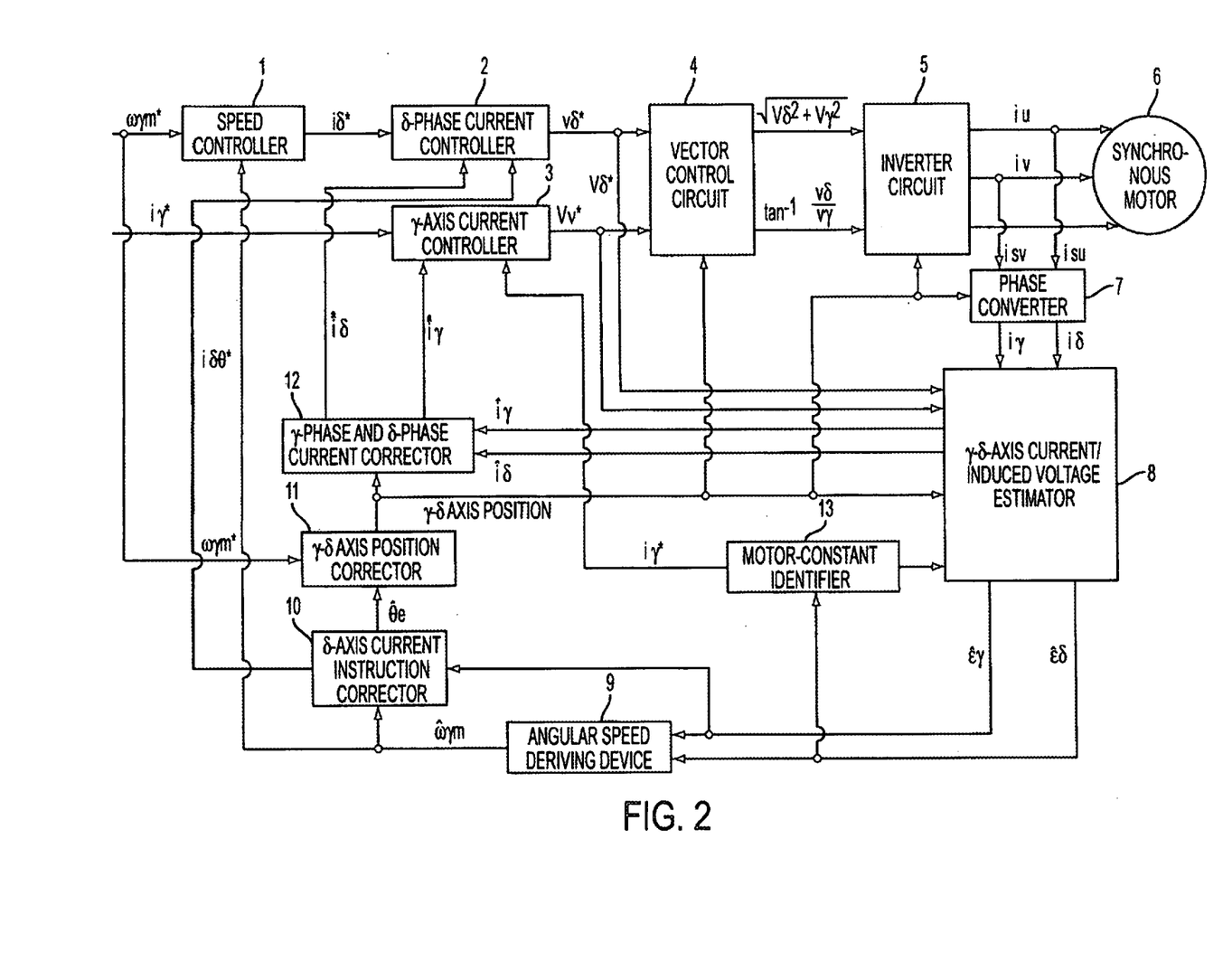
FIG. 2 is a block diagram showing a control system to which is applied a method of controlling the speed of a synchronous motor according to a second embodiment of the present invention.

As shown in FIG. 2, an angular-speed instruction $\omega_{rm}^*$ and an estimated angular-speed $\omega_{rm\ est}$ are input to the speed controller 1, and the speed controller 1 outputs a δ-phase current instruction iδ*. An estimated induced voltage $\epsilon\gamma_{est}$ is input to the δ-axis current instruction corrector 14 (proportional integration controller) From known $\epsilon \sin \theta_{e\ est}$, an angle of error θe is estimated, and a δ-axis corrected current instruction $i_{\delta\theta}^*$ appropriate to the angle of error is output. The δ-phase current controller 2 receives an estimated δ-phase current $i\delta_{est2}$ output from the current corrector and the current instructions iδ* and iδθ* and outputs a δ-phase voltage instruction Vδ*, thereby dampening transient vibrations in the "d" axis. The positive current iδθ* is caused to flow to the δ axis, thereby pulling and constraining a magnetic axis so as to prevent an excessive increase in the angle of load.

As in the case shown in FIG. 1, a positive γ-phase current instruction iγ* and an estimated γ-phase current $i\gamma_{est2}$ are input to the γ-phase current controller 3. The γ-phase current controller 3 outputs a γ-phase voltage instruction Vγ*. The δ-phase current instruction Vδ*, the γ-phase voltage instruction Vγ*, and the position of the γ-δ axis output from the γ-δ-axis position corrector 11 are input to the vector control circuit 4. The absolute value $(V\delta^2+V\gamma^2)^{1/2}$ of a voltage and a phase $\tan^{-1}(V\delta/V\gamma)$ from the γ-axis in a direction in which a voltage is output are input to the inverter circuit 5, and a turn-on operation is implemented.

A γ-phase current iγ is produced as a result of a stator current $i_u$ of the synchronous motor 6 passing through the phase converter 7. A δ-phase current iδ is produced as a result of a stator current $i_v$ passing through the phase converter 7. The γ-phase current iγ, the δ-phase current iδ, the position of the γ-δ axis, and the voltage instructions Vδ* and Vγ* are input to the γ-δ-axis current/induced voltage estimator 8. By means of known formula (1), the γ-δ-axis current/induced voltage estimator 8 outputs estimated γ-δ-phase currents $i\gamma_{est}$ and $i\delta_{est}$ and induced γ-δ-phase voltages $\epsilon\gamma_{est}$ and $\epsilon\delta_{est}$. The induced γ-δ-phase voltages $\epsilon\gamma_{est}$ and $\epsilon\delta_{est}$ are input to the angular-speed deriving section 9, where an estimated angular speed $\omega_{rm\ est}$ is derived by means of formulas (2) and (3). A speed instruction $\omega_{rm}^*$ is input to the γ-δ-axis position corrector 11, where the position of the γ-δ axis is corrected by means of formula (4).

$$\frac{d}{dt}\begin{bmatrix} \hat{i}_\gamma(k+1) \\ \hat{i}_\delta(k+1) \\ \hat{\epsilon}_{\gamma y}(k+1) \\ \hat{\epsilon}_{\delta y}(k+1) \end{bmatrix} = \begin{bmatrix} 1-\frac{R_s}{L_d}\cdot T_s & \frac{L_q}{L_d}\cdot \hat{\omega}_{rm}(k)\cdot T_s & T_s & 0 \\ -\frac{L_d}{L_q}\hat{\omega}_{rm}(k)\cdot T_s & 1-\frac{R_s}{L_q}\cdot T_s & 0 & T_s \\ 0 & 0 & 1 & 0 \\ 0 & 0 & 0 & 1 \end{bmatrix} \quad (1)$$

-continued $$\begin{bmatrix} \hat{i}_\gamma(k) \\ \hat{i}_\delta(k) \\ \hat{\varepsilon}_{\gamma y}(k) \\ \hat{\varepsilon}_{\delta y}(k) \end{bmatrix} + T_s \begin{bmatrix} \frac{1}{L_d} & 0 \\ 0 & \frac{1}{L_q} \\ 0 & 0 \\ 0 & 0 \end{bmatrix} \begin{bmatrix} v_\gamma(k) \\ v_\delta(k) \end{bmatrix} + T_s \begin{bmatrix} k_1 & k_2 \\ k_3 & k_4 \\ k_5 & k_6 \\ k_7 & k_8 \end{bmatrix} \begin{bmatrix} i_\gamma(k) - \hat{i}_\gamma(k) \\ i_\delta(k) - \hat{i}_\delta(k) \end{bmatrix}$$

$$\sin\{\bar{\omega}_{rm}(k+1)\} = -\sin\{\bar{\epsilon}_\delta(k+1)\} \quad \ldots (2)$$

$$\hat{\omega}_{rm}(k+1) = \sin\{\hat{\varepsilon}_\delta(K+1)\} \cdot \{\hat{\varepsilon}_\gamma^2(k+1) + \hat{\varepsilon}_\delta^2(k+1)\}^{\frac{1}{2}} \cdot \left(\frac{L}{\phi_{mag}}\right) \quad (3)$$

$$\rho^*(k+1) = \rho^*(k) + \omega_{rm}^*(k+1) \cdot T_s \quad (4)$$

Figure 3:
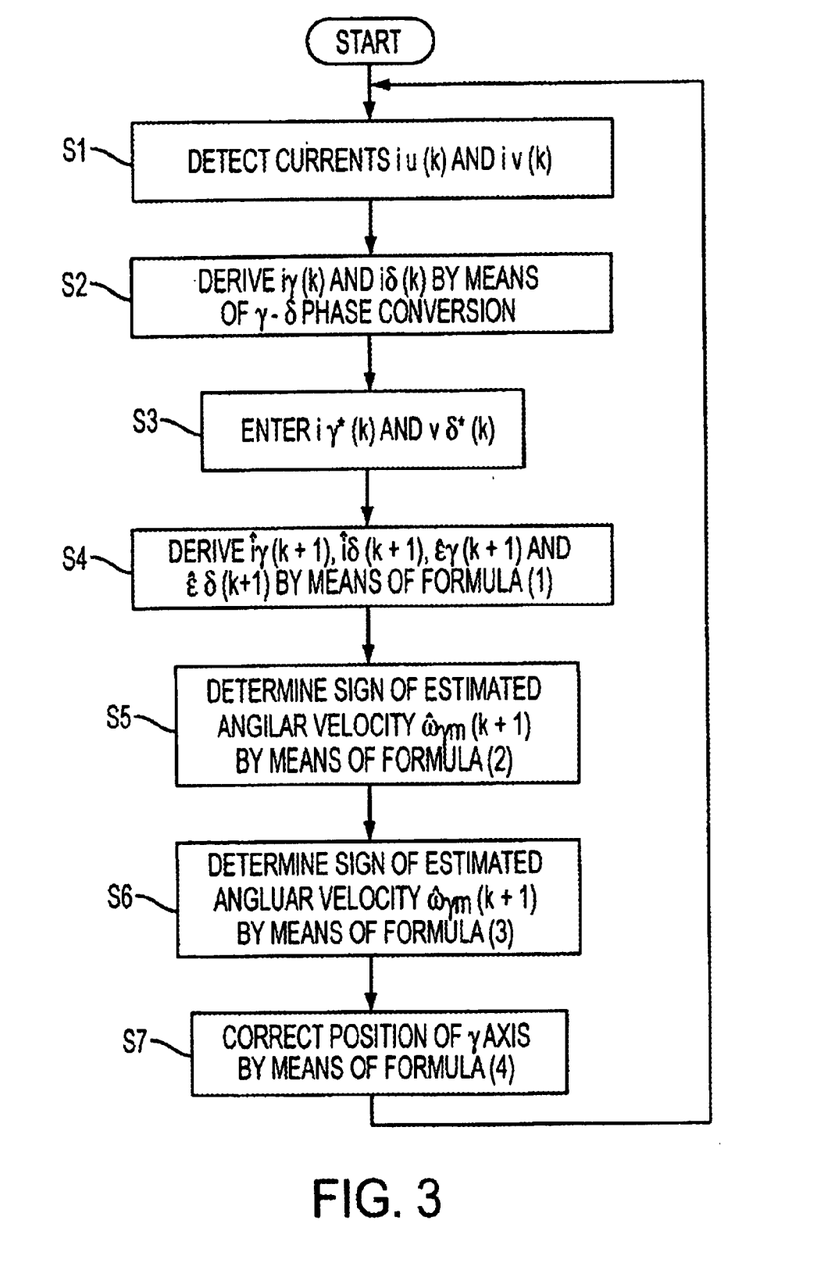
FIG. 3 is a flowchart showing the operation of the control system shown in FIG. 2.

The basic braking operation of the control system will now be described by reference to a flowchart shown in FIG. 3.

At least currents of two phases supplied to the synchronous motor at a point in time k·Ts second; for example, $i_u(k)$ and $i_v(k)$, are detected (step S1). The electric currents are converted into the γ-δ-axis coordinate system corrected in a previous loop, thereby deriving iγ(k) and iδ(k) (step S2). Voltage instructions Yγ(K) and Yδ(K) converted into the γ-δ coordinate system are input (step S3). By means of formula (1), there are derived estimated values at time (k+1)·Ts seconds; that is, $i\gamma_{est}(k+1)$, $i\delta_{est}(k+1)$, $\epsilon\gamma_{est}(k+1)$, and $\epsilon\delta_{est}(k+1)$ (step S4).

From the sign of the estimated $\epsilon\delta_{est}(k+1)$, the sign of angular speed is determined (step S5). $\omega_{rm\,est}(k+1)$ is derived from the sum of the square of $\epsilon\gamma_{est}(k+1)$ and the square of $\epsilon\delta_{est}(k+1)$ by means of the thus-determined sign and formulas (2) and (3) (step S6). The position of the γ axis is corrected by means of formula (4) (step S7).

As mentioned above, if a heavy load is exerted on the motor by means of control within a low-speed range, thereby excessively increasing the angle of load θe, an increase in the angle of load θe is prevented by means of pulling the δ axis through use of iδθ* as well as by means of pulling the "d" axis through use of iγ*. Accordingly, a deviation between the d-q axis and the γ-δ axis is eliminated, and excellent vector control can be effected by means of control according to the flowchart.

Japanese Patent Application Laid-Open No. 174499/1998 describes a method. According to the method, in a case where a rotation speed $\omega_R\gamma$ of the γ-δ axis is determined such that control is smoothly switched from a low-speed range to a high-speed range, there are prepared a distribution gain K1 set so as to become smaller as the absolute value of a rotation speed instruction $\omega_{PREF}$ increases and a distribution gain K2 set so as to become greater as the absolute value of a rotation speed instruction $\omega_{PREF}$ increases. In a high-speed range, the proportion of K2 is designed so as to become sufficiently greater than that of K1. In a low-speed range, the proportion of K1 is designed so as to become sufficiently greater than that of K2. Thereby, through use of a single algorithm there is performed control from a low-speed range to a high-speed range with little variation in torque.

This control method is based on the premise that no load is exerted on the motor. The method cannot be applied to a case where load imposed on the motor becomes heavier and where a deviation between the angle of the "d" axis and the angle of the γ axis is wide. If the angle of load is greater in this case, positive currents iγ* and iδθ* are caused to flow in the present embodiment, thereby pulling and constraining the "d" axis. By means of the above-described control operation being performed, good vector control can be expected over a range from a low-speed range to a high-speed range.

A third embodiment of the present invention will now be described by reference to the drawings.

Reference numerals designate the following elements:
1 speed controller
2 δ-axis current controller
3 γ-axis current controller
4 vector control circuit
5 inverter circuit
6 synchronous motor
7 phase converter
8 γ-δ-axis current/induced voltage estimator
9 angular-speed deriving section
11 γ-δ-axis position corrector
12 γ-phase/δ-phase current corrector
13 motor-constant identifier According to a sensorless vector control method for a synchronous motor described in Japanese Patent Application Laid-Open No. 308286/1996, stator currents $i_g$ and $i_h$ converted into the γ-δ coordinate system set on the magnetic axis of the rotor, a difference between electric currents $i_{gest}$ and $i_{dest}$ estimated most recently, and voltage instructions $v_g$ and $v_d$ are entered. A current defined in the γ-δ coordinate system, the estimated current $i_{dest}$, the induced voltages $e_{gest}$ and $e_{dest}$, and the speed $\omega_{rmest}$ of the rotor are estimated.

There are detected at least stator currents of two phases supplied to the synchronous motor at a point in time k·Ts seconds (where k=0, 1, 2, ..., and Ts denotes a sampling time) according to the method. The electric currents are converted into the γ-δ-axis coordinate system set on the rotor, thereby deriving a γ-axis current $i_g(k)$ and a δ-axis current $i_d(k)$. Through use of the estimated γ-axis current $i_g(k)$ and the estimated δ-axis current $i_d(k)$ that were derived most recently, and the voltages $v_g(k)$ and $v_d(k)$, the status formula pertaining to the γ-θ-axis coordinate system of the synchronous motor is developed to a discrete value system.

$$\frac{d}{dt}\begin{bmatrix} i_{gest}(k+1) \\ i_{dest}(k+1) \\ \varepsilon_{Ygest}(k+1) \\ \varepsilon_{dest}(k+1) \end{bmatrix} = \begin{bmatrix} 1 - \frac{R_s}{L_d} \cdot T_s & \frac{L_q}{L_d} \cdot \omega_{rm}(k) \cdot T_s & T_s & 0 \\ -\frac{L_d}{L_q}\omega_{rm}(k) \cdot T_s & 1 - \frac{R_s}{L_q} \cdot T_s & 0 & T_s \\ 0 & 0 & 1 & 0 \\ 0 & 0 & 0 & 1 \end{bmatrix} \quad (5)$$

-continued $$\begin{bmatrix} i_{gest}(k) \\ i_{dest}(k) \\ \varepsilon_{gest}(k) \\ \varepsilon_{dest}(k) \end{bmatrix} + T_s \begin{bmatrix} \frac{1}{L_d} & 0 \\ 0 & \frac{1}{L_q} \\ 0 & 0 \\ 0 & 0 \end{bmatrix} \begin{bmatrix} v_\gamma(k) \\ v_\delta(k) \end{bmatrix} + T_s \begin{bmatrix} k_1 & k_2 \\ k_3 & k_4 \\ k_5 & k_6 \\ k_7 & k_8 \end{bmatrix} \begin{bmatrix} i_\gamma - i_{gest} \\ i_\delta - i_{dest} \end{bmatrix}$$

wherein $e_{gest} = -\sin\theta e(\omega \text{ rm}/L_q)\Phi\text{mag}$, $e_{dest} = \cos\theta e(\omega \text{ rm}/L_q)\Phi\text{mag}$, Rs: resistance of stator, Lq: inductance of "q" axis;

Ld: inductance of d-axis

θe: deviation in angle between γ-δ axis and d-q axis, $\omega_{rm}$: angular-speed of rotor, Φmag: magnetic flux developing in permanent magnet.
Thus, the estimated currents $i_{gest}(k+1)$ and $i_{dest}(k+1)$ and the estimated induced voltages $e_{gest}(k+1)$ and $e_{dest}(k+1)$ are determined at time (k+1) seconds.

By means of formula (5), a δ-axis voltage/current equation is expressed as $$i\,dest(k+1) = i\,dest(k) + \frac{T_s}{L_q} \cdot vd(k) - \frac{T_s \cdot R_s}{L_q} \cdot i\,dest(k) - \frac{T_s \cdot L_d}{L_q} \cdot \omega rmest(k) \cdot i\,gest(k) - \frac{T_s}{L_q} \cdot e\,dest(k). \quad (6)$$

In a steady state, $i_{dest}(k+1) = i_{dest}(k)$, and hence there is derived $$\frac{T_s}{L_q} \cdot vd(k) - \frac{T_s \cdot R_s}{L_q} \cdot i\,dest(k) - \frac{T_s \cdot L_d}{L_q} \cdot \omega rmest(k) \cdot i\,gest(k) - \frac{T_s}{L_q} \cdot e\,dest(k) = 0. \quad (7)$$

When no load is exerted on the motor, the δ-axis current $i_{dest}(k)$ serving as a torque-component current becomes zero. At this time, the δ-axis voltage/current equation is expressed as $$\frac{T_s}{L_q} \cdot vd(k) - \frac{T_s \cdot L_d}{L_q} \cdot \omega rmest(k) \cdot i\,gest(k) - \frac{T_s}{L_q} \cdot e\,dest(k) = 0. \quad (8)$$

Here, the motor is controlled such that i g(k)=0, we have $$\frac{T_s}{L_q} \cdot vd(k) - \frac{T_s}{L_q} \cdot e\,dest(k) = 0. \quad (9)$$

Therefore, $e_{dest}(k) = v_d(k)$, and the estimated induced voltage does not depend on the motor constant. An estimated speed determined when no correction is made to the estimated induced voltage is expressed as $$\omega' gest(k) = \frac{e\,dest(k)}{Ke}. \quad (10)$$

Hence, the estimated speed is influenced by only an induced voltage constant.

Further, when compared with an estimated speed determined when a correction is made to the estimated induced voltage; that is, $$\omega gest(k) = \frac{[e\,gest(k)^2 + e\,dest(k)^2]^{\frac{1}{2}}}{ke}, \quad (11)$$

the induced voltage constant ke is tuned such that $\omega_{gest}(k) + \alpha = \omega_{gest}(k)$ (α>0, the amount of α is now uncertain).

Figure 4:
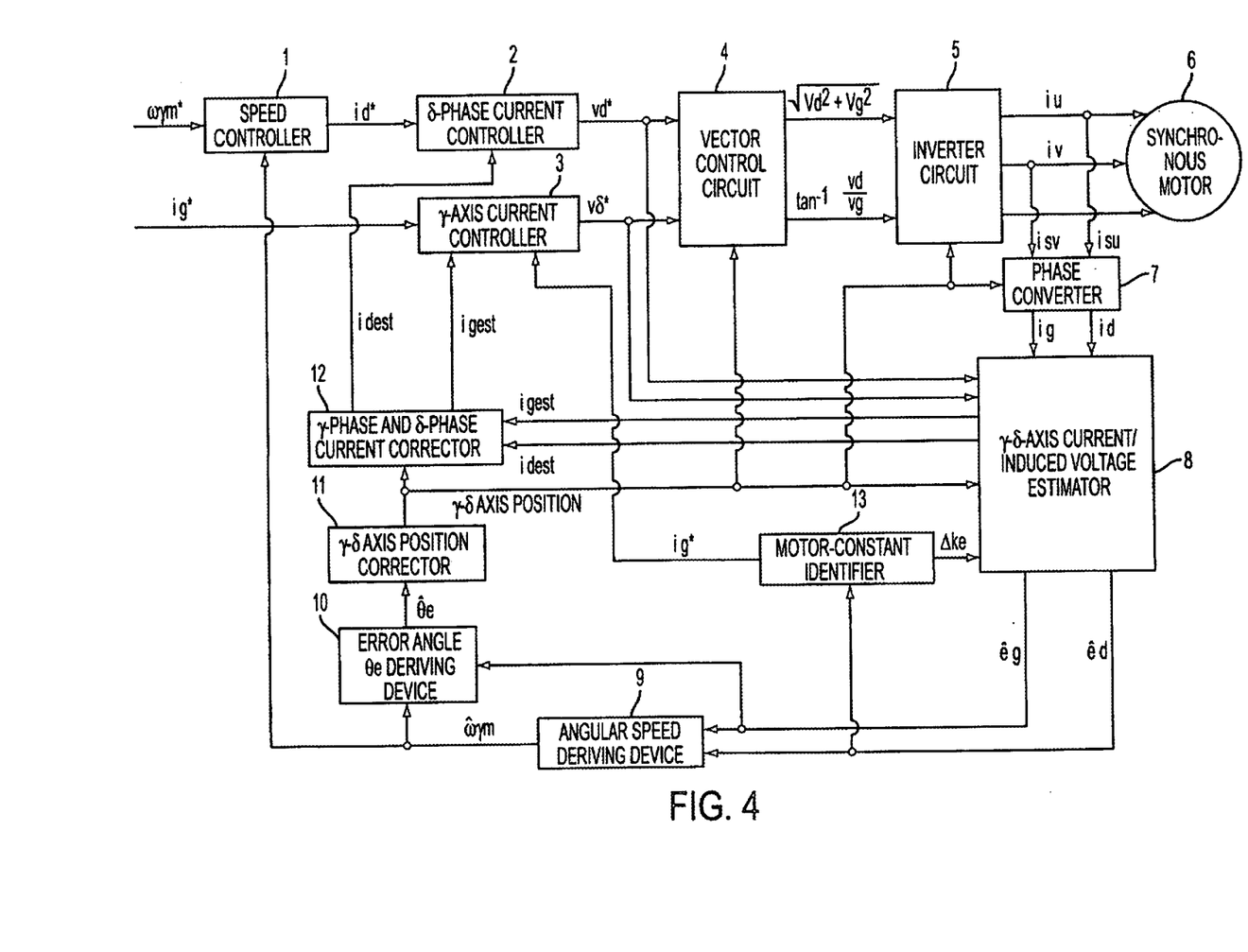
FIG. 4 is a block diagram showing a control system of a synchronous motor according to a third embodiment of the present invention.
Figure 5:
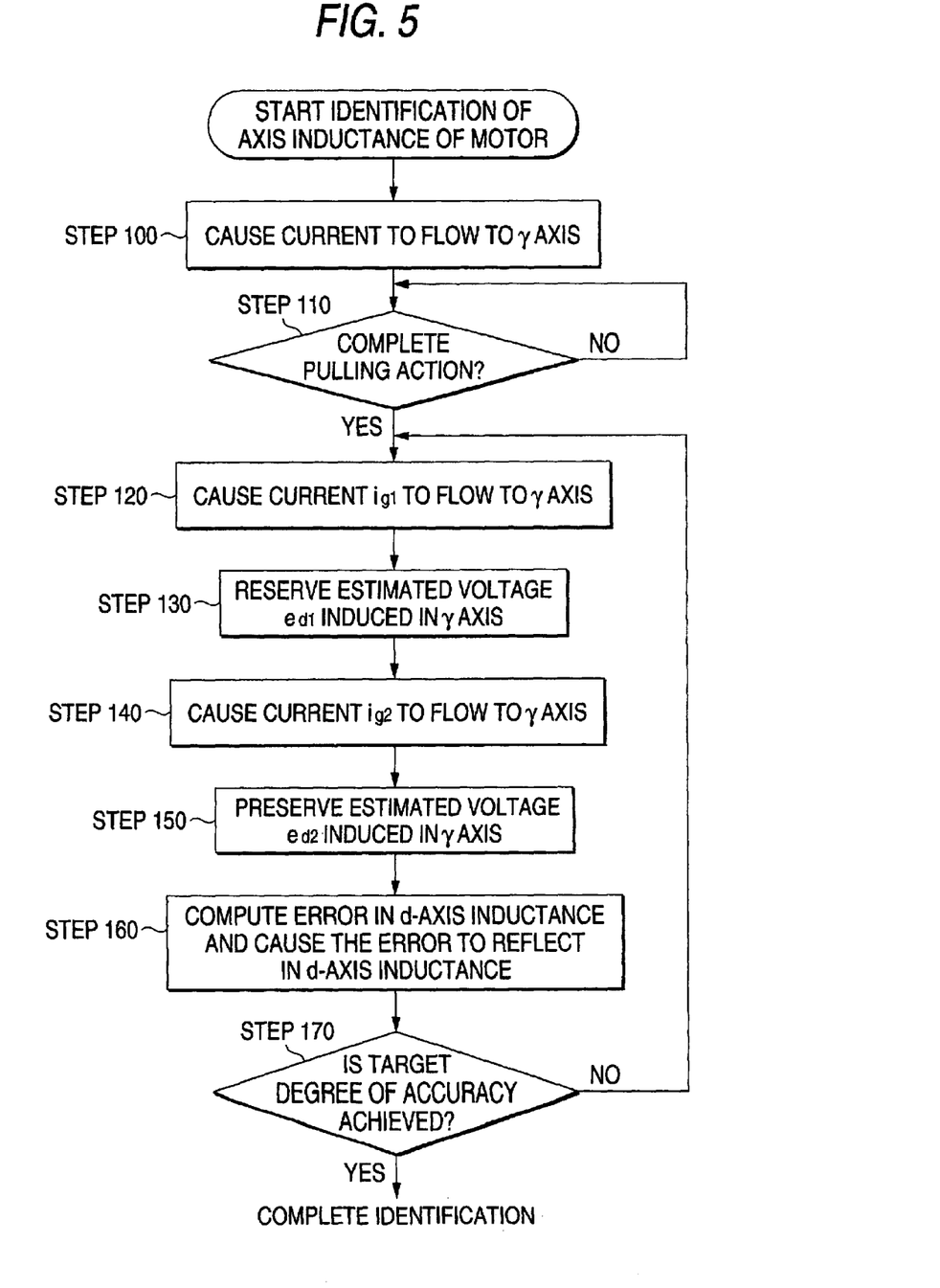
FIG. 5 is a flowchart showing a discrete value system.

FIG. 4 is a block diagram showing a synchronous motor control system to which is applied a method of identifying resistance according to an embodiment of the present invention. FIG. 5 is a flowchart showing a digital control operation according to the method of identifying resistance.

As can be seen from the control system appearing in the block diagram shown in FIG. 4, an angular-speed instruction $\omega_{rm}*$ and an estimated angular-speed $\omega_{rm\,est}$ are input to the speed controller 1, and the speed controller 1 outputs a δ-axis current instruction iδ*. The δ-axis current controller 2 receives the δ-axis current instruction $i_{q*}$ and the estimated δ-axis current $i_{dest}$ and outputs a δ-axis voltage instruction $V_{d*}$. A γ-axis current instruction $i_{g*}$ and an estimated γ-axis current $i_{gest}$ are input to the γ-axis current controller 3. The γ-axis current controller 3 outputs a γ-axis voltage instruction $V_{g*}$. The position of the γ-δ axis output from the γ-δ-axis position corrector 11 and voltage instructions $V_{d*}$ and $V_{g*}$ are input to the vector control circuit 4. The absolute value $(V_d^2 + V_g^2)^{1/2}$ of a voltage and a phase $\tan^{-1}(V_d/V_g)$ from the γ-axis in a voltage-output direction are input to the inverter circuit 5, and a turn-on operation is implemented.

A γ-axis current $i_g$ is produced as a result of a stator current $i_u$ of the synchronous motor 6 passing through the phase converter 7. A δ-axis current $i_d$ is produced as a result of a stator current $i_v$ passing through the phase converter 7. The γ-phase current $i_g$, the δ-phase current $i_d$, the position of the γ-δ axis, and the voltage instructions $V_{d*}$ and $V_{g*}$ are input to the γ-δ-axis current/induced voltage estimator 8. By means of formula (5), the γ-δ-axis current/induced voltage estimator 8 outputs estimated γ-δ-axis currents $i_{gest}$ and $i_{dest}$ and induced γ-δ-axis voltages $e_{gest}$ and $e_{dest}$. The motor-constant identifier 13 outputs, to the γ-axis current controller 3, several types of γ-axis current instructions $i_{g*}$. The motor-constant identifier 13 computes a resistance error ΔRs such that variation among estimated γ-axis induced voltages $e_{gest}$ output from the γ-δ-axis current/induced voltage estimator 8 at that time approximate zero. The thus-computed resistance error is reported to the γ-δ-axis current/induced voltage estimator 8.

The flowchart shown in FIG. 5 shows processing of the motor-constant identifier 13 according to the present invention.

In the flowchart shown in FIG. 5, an operation is commenced at $\omega_{rm*}$ (step 110), and the motor awaits until there is achieved $\omega_{rm*} = \omega_{rest}$ (step 10).

Next, the estimated δ-axis induced voltage $e_{dest}$ is determined (step 120), and there is computed an estimated speed $\omega_{gest}$ which is defined by means of adding a correction to the estimated induced voltage (step 130).

Further, there is computed an estimated speed $\omega_{gest'}$ which is defined without addition of a correction to the estimated induced voltage (step 140).

Next, the amount of variation in estimated speed is computed (step 150), and an identification limit is determined in step 160.

In step 170, the induced voltage constant ke is adjusted. If variation in speed has achieved a target degree of accuracy, identification of an induced voltage constant is completed. In contrast, if variation in speed has not yet achieved a target degree of accuracy, processing pertaining to step 140 to processing pertaining to step 180 are iterated until a target degree of accuracy is achieved.

Formula (8) can be rewritten as $$v\ d(k) - Ld \cdot \omega\ rmest(k) \cdot i\ gest(k) - e\ dest(k) = 0 \quad (12).$$

However, an error $\Delta Ld$ is included in the d-axis inductance Ld, so that formula (8) becomes $$v\ d(k) - Ld \cdot \omega\ rmest(k) \cdot i\ gest(k) - \Delta Ld \cdot \omega\ rmest(k) \cdot i\ gest(k) - e\ dest(k) - \Delta e\ dest(k) = 0 \quad (13).$$

Since not a real voltage but an instruction voltage_is used as $v_d(k)$, formula (8) is defined as below, in consideration of an error $\Delta v_d$ between a real voltage and an instruction voltage $$v\ d(k) - \Delta v\ d(k) - Ld \cdot \omega\ rmest(k) \cdot i\ gest(k) - \Delta Ld \cdot \omega\ rmst(k) \cdot i\ gest(k) - e\ dest(k) - \Delta e\ dest(k) = 0 \quad (14).$$

$\Delta e_{dest}$ for canceling $\Delta L_d \cdot \omega_{rmest}(k) \cdot i_{gest}$ and $\Delta v_d$ arises for satisfying formula (8), there stands $$e\ dest(k) = v\ d(k) - \Delta Ld \cdot \omega\ rmest(k) \cdot i\ gest(k) \quad (15).$$

Provided that the synchronous motor is rotating at constant speed, formula (7) becomes a linear equation which includes $\Delta L_d$ as a slope and a voltage error $\Delta v_d$ as an intercept. Through use of formula (11), a different current is caused to flow to the γ axis, and the resistance error $L_d$ is controlled such that estimated δ-axis induced voltages $e_{dest}$ (k) become equal to each other, thereby identifying the d-axis inductance of the synchronous motor.

Figure 6:
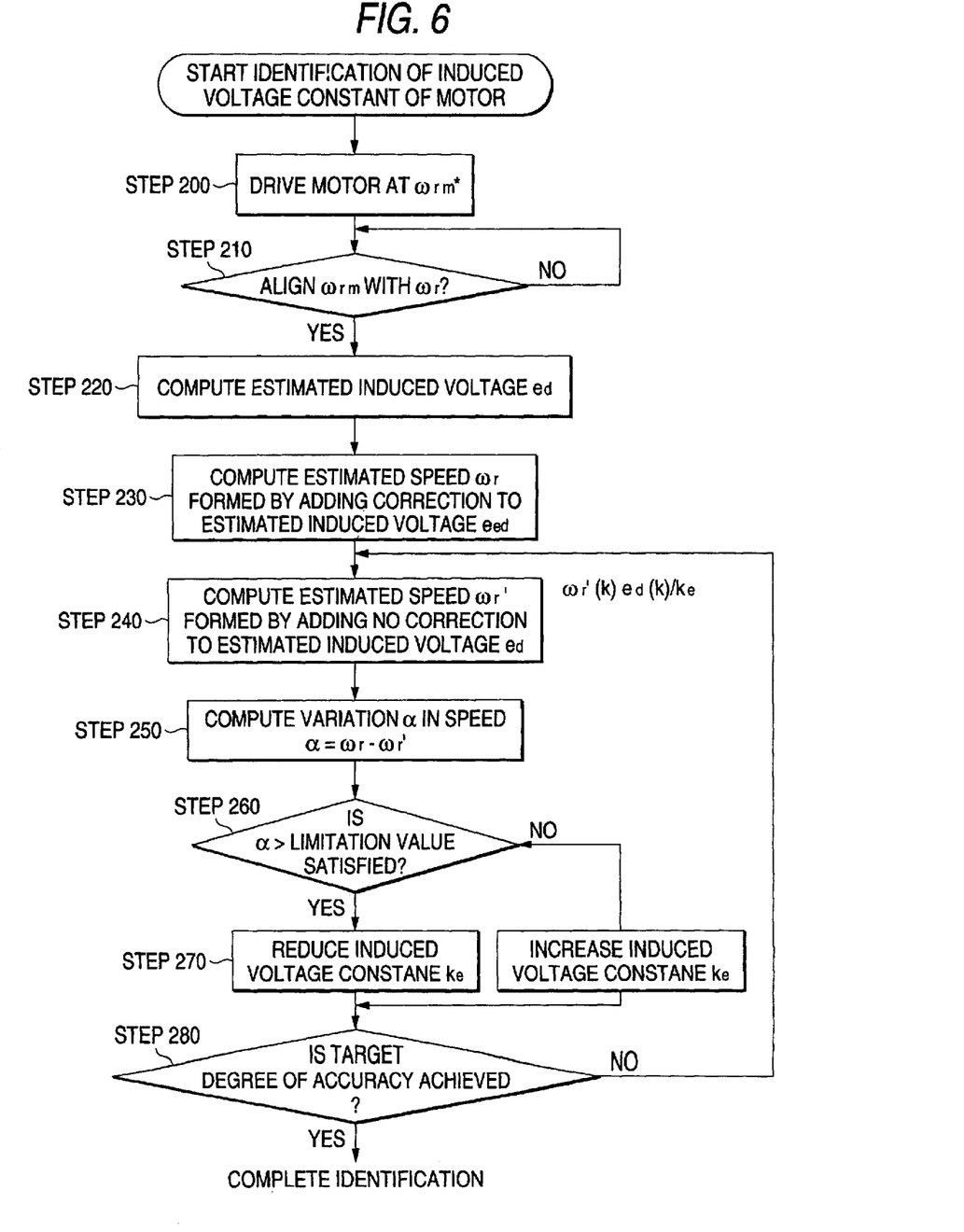
FIG. 6 is a flowchart showing a discrete value system according to another embodiment of the present invention.

FIG. 6 is a flowchart showing a digital control operation according to a method of identifying an induced voltage constant of a motor.

Figure 7:
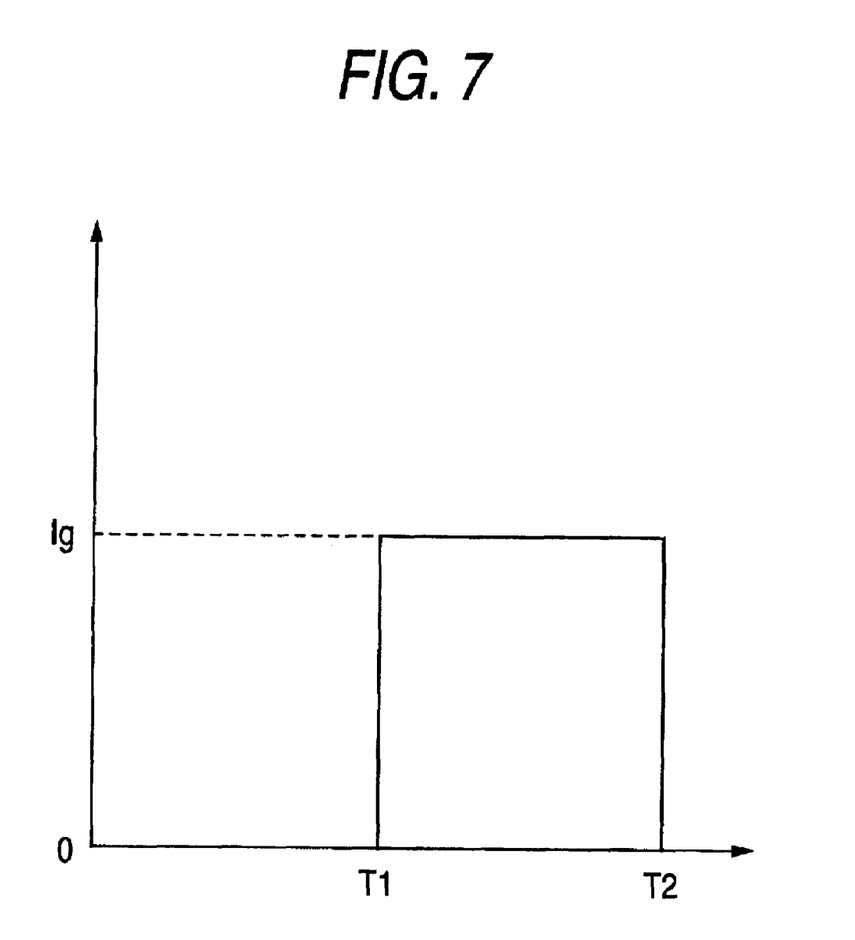
FIG. 7 is a waveform diagram showing a pattern of rise in current.

In the flowchart shown in FIG. 6, the current $I_g$ is flowed to the γ axis for pulling the magnetic axis to the γ axis in accordance with a pattern shown in FIG. 7 (step 200). As shown in FIG. 7, the γ-axis current $i_g$ is boosted at time T1, and the motor awaits for a period of time T2 until rotation becomes stable while a current is flowing through the motor (step 210). In another step, a current is caused to flow to the γ axis, and the motor awaits for a period of time T1 and a period of time T2 at the time of reading an estimated induced voltage, in much the same manner as mentioned previously.

A current $i_{g1}$ is caused to flow to the γ axis (step 220), and an estimated δ-axis induced voltage ed1 is sought at that time (step 230).

An current $i_{g2}$ is caused to flow to the γ axis (step 240), and an estimated γ-axis induced voltage $e_{d2}$ is sought at that time (step 250).

By means of formula (15), an induced voltage constant is computed from the current $i_{g1}$ determined in step 220, the current $i_{g2}$ determined in step 240, and variation between the estimated δ-axis induced voltage $e_{d1est}$ determined in step 230 when the γ-axis current instruction is changed and the estimated δ-axis induced voltage $e_{d2est}$ determined in step 250 when the γ-axis current instruction is changed. The thus-computed induced voltage constant reflects the currently-set induced voltage constant (step 260). When the induced voltage constant has achieved a target degree of accuracy, identification of an induced voltage is completed. In contrast, if the induced voltage constant has not yet achieved a target degree of accuracy, processing pertaining to step 220 to processing pertaining to step 260 are iterated until a target s degree of accuracy is achieved.

Industrial Applicability

As has been described, the present invention enables excellent speed control of a synchronous motor even at low speed by means of a sensorless vector control method, by means of causing a positive current to flow to a γ axis, to thereby induce torque for constraining a magnetic axis "d."

A phase at which a magnetic axis is pulled by means of control within a low-speed range is caused to lead the γ axis in accordance with the angle of load. Even if the angle of load becomes great, the γ axis serving as a control axis is aligned with a "d" axis serving as the magnetic axis of the synchronous motor, thereby enabling excellent transition of control to vector control.

According to the present invention, an estimated speed $\omega_{rmest'}$ which is not provided with a correction is computed from an axis induced voltage $e_{dest}$ estimated by a γ-δ-axis current/induced voltage estimator. An induced voltage constant is identified such that the speed $\omega_{rmest'}$ becomes equal to the estimated speed $\omega_{rmest}$ to which a correction is made. Such a method is embodied as software, and hence parameters can be identified accurately at high speed, thereby enabling realization of control of a high-performance motor.

By utilization of variation in δ-axis induced voltages estimated by the γ-δ-axis current/induced voltage estimator, d-axis inductance of the synchronous motor is identified. Such a method is constructed in the form of software, thereby enabling high-speed and accurate identification of parameters. Thereby, control of a high-performance motor can be realized.

What is claimed is:

1. A sensorless control method for a synchronous motor, comprising the steps of:

taking a magnetic axis of the synchronous moto as a "δ" axis and taking an axis leading the δ axis by 90° C. as a ""axis;

taking a coordinate γ-δ axis rotating at a synchronous motor rotation speed iδk and a specified magnetic axis of the synchronous electric motor as γ, and taking an axis leading γby 90° C. as δ, thereby setting a γ-δ axis rotation at a synchronous motor rotation instruction speed $\omega_{rm}$ taking a δ-axis direction current instruction iγ(k) and δ-axis direction current instruction iδ(k) as positive, thereby inducing torque for constraining maxnetic axis "δ"at an angle leading the γaxis;

deriving a δ-axis direction current instruction by means of feedback control for multiplying, by gain, a variation between the synchronous motor rotation instruction speed $\omega_{rm}$ and an estimated speed $\omega_{rm}$ derived through disturbance observation, which observation is prepared by a δ-axis current formula and is taken as a synchronous motor induced voltage disturbance, adding, to the δ-axis direction current instruction, a variation angle correction instruction iδ(k) derived from an external observation by way of a proportional integration controller, the observation being prepared by a γ-axis current formula and being taken as a synchronous motor induced voltage disturbance; and aligning a γaxis rotating at instruction speed $\omega_{rm}$ with a real magnetic axis "d."

2. A method of identifying a constant of a controller of a synchronour motor which computes the speed of the motor from two-phase current supplied to the motor, the controller including a δ-axis speed controller for outputting a δ-axis current instruction on the basis of a signal reading to a variation between a speed instruction and the speed of the motor, a δ-axis current controller for computing a δ-axis voltage instruction from a δ-axis current instruction, a δ-axis current controller for computing a δ-axis voltage instruction from a δ-axis current instruction, a vector control circuit outputting the absolute value of a voltage instruction and the phase of the voltage instruction on the basis of the δ-axis voltage instruction and tye γ-axis voltage instruction, and an inverter circuit for supplying a drive current to the synchronous motor on the basis of the absolute value of a voltage instruction and the phase of the voltage instruction, the method comprising the steps of:

setting an ααβ space coordinate system which takes a U phase of a rotor of the motor as an αaxis and has a βaxis leading from the αby an electric angle of 90° C. in the direction of forward rotation;

assuming a γ-δaxis rotating at a synchronous motor rotation instruction speed $\omega_{rm}$ in the α-βspace coordinate system while taking a real magnetic axis of the synchronous motor as a "d" axis, taking an axis leading 90° C. from the "d" as a "q" axis, a coordinate d-q axis rotating at a sychronous motor rotation speed iδ(k) and a specified magnetic axis of the sychronous motor as a γ axis, and taking an axis leading the γ axis by 90° C. and a δ axis; and adjusting an induced voltage constant such that an estimated speed iδ(k) to which a correction is added so as to become equal to an estimates speed $\omega_{rm}$ to which no correction is added, through use of a synchronous motor induced voltage edest prepared by a δ-axis current formula taking a γ-δ axis current and a δ-axis voltage instruction iδθ* as inputs and taking a voltage induced in the synchronous motor as a disturbance, thereby identifying the induced voltage constant.

3. The method of identifying a constant of a controller of a synchronous motor according to claim 3, wherein the method if embodied as software, and the software is installed in an inverter, thereby embedding means for accurately identifying a constant at high speed.

4. A method of identifying a constant of a synchronous motor which computes the speed of the motor from two-phase current supplied to the motor, the controller including a δ-axis speed controller for outputting a δ-axis current instruction on the basis of a signal relating to a variation between a speed instruction and the speed of the motor, a δ-axis current controller for computing a δ-axis voltage instruction from a δ-axis current instruction, a γ-axis current controller for computing a δ-axis voltage instruction from a γ-axis current instruction, a vector control circuit outputting the absolute value of a voltage instruction and the phase of the voltage instruction on the basis of the δ-axis voltage instruction and the γ-axis voltage instruction, and an inverter circuit for supplying a drive current to the synchronous motor on the basis of the absolute value of a voltage instruction and the phase of the voltage instruction, the method comprising steps of:

setting an α-βspace coordinate system which take a U phase of a rotor of the motor as an αaxis and has a βaxis leading the αby an electric angle of 90° C. in the direction of forward rotation;

setting a γ-δaxis rotating at a synchronous motor rotation instruction speed $\omega_{rm}$ in the α- βspace coordinate system while taking a real magnetic axis of the synchronous motor as a "d"axis, taking an axis leading 90° C. the "d"axis as a "q"axis, a coordinate d-q axis rotating at a synchronous motor rotation speed $\omega_{rm}$ and a specified magnetic axis of the synchronous motor as a γaxis, and taking an axis leading the γaxis by 90° C. as a δaxis;

causing several different curents $i_g^*$ to flow toward the γthrough use of an estimated δ-axis induced voltage $e_{dest}$and a γ-axis current instruction $i_g^*$ which are prepared y a δ-axis current formula, the formula takin a γ-axis direction current $i_d$and a δ-axis voltage instruction $v_d^*$ as inputs and taking a δ-axis induced voltage $e_d$as a disturbance; and adjusting a d-axis inductance such that the estimated δ-axis induced voltages $e_{dest}$arising at the time become equal to each other, thereby identifying the d-axis inductance.

5. The method of identifying a constant of a controller of a synchronous motor according to claim 5, wherein the method for identifying d-axis inductance of the synchronous motor is embodies as software, and the software is installed in an inverter, thereby embodying means for accurately identifying a constant at high speed.

* * * * *